E. SCHNEIDER.
WHEELED GUN CARRIAGE WITH DIVERGIBLE TRAILS.
APPLICATION FILED FEB. 14, 1918.
1,310,142.
Patented July 15, 1919.
6 SHEETS—SHEET 1.
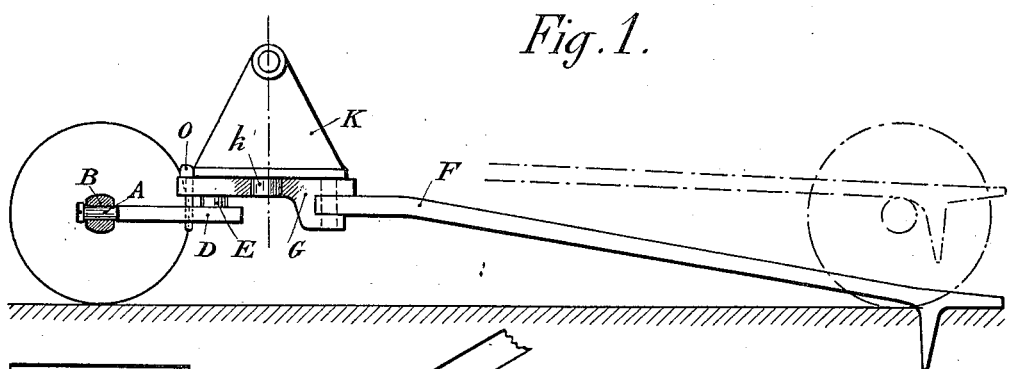
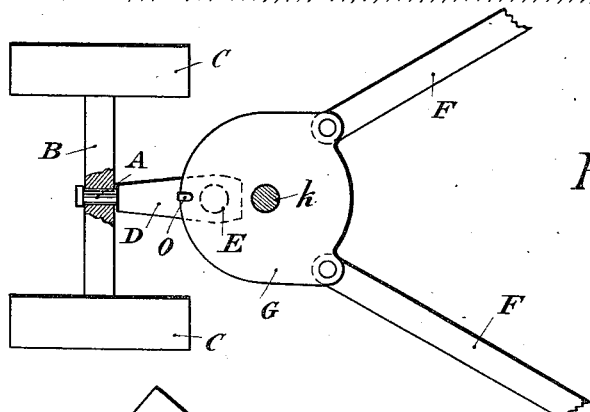
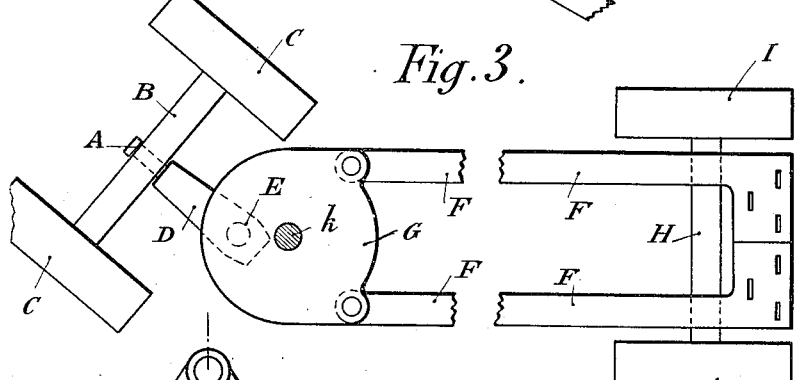
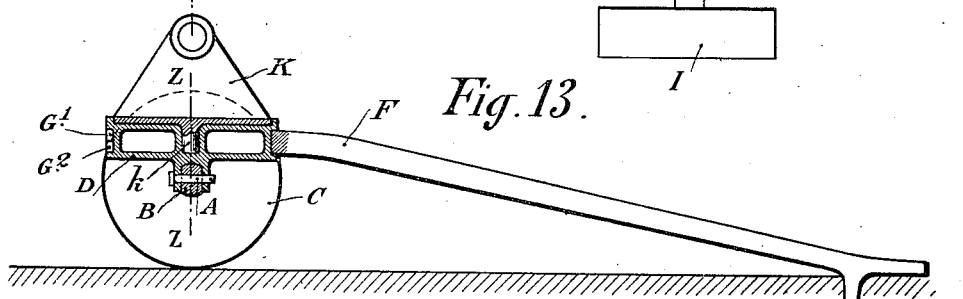

E. SCHNEIDER.
WHEELED GUN CARRIAGE WITH DIVERGIBLE TRAILS.
APPLICATION FILED FEB. 14, 1918.

1,310,142.

Patented July 15, 1919.
6 SHEETS—SHEET 2.

E. SCHNEIDER.
WHEELED GUN CARRIAGE WITH DIVERGIBLE TRAILS.
APPLICATION FILED FEB. 14, 1918.

1,310,142.

Patented July 15, 1919.
6 SHEETS—SHEET 3.

E. SCHNEIDER.
WHEELED GUN CARRIAGE WITH DIVERGIBLE TRAILS.
APPLICATION FILED FEB. 14, 1918.

1,310,142.

Patented July 15, 1919.
6 SHEETS—SHEET 4.

E. SCHNEIDER.
WHEELED GUN CARRIAGE WITH DIVERGIBLE TRAILS.
APPLICATION FILED FEB. 14, 1918.
1,310,142.
Patented July 15, 1919.
6 SHEETS—SHEET 5.
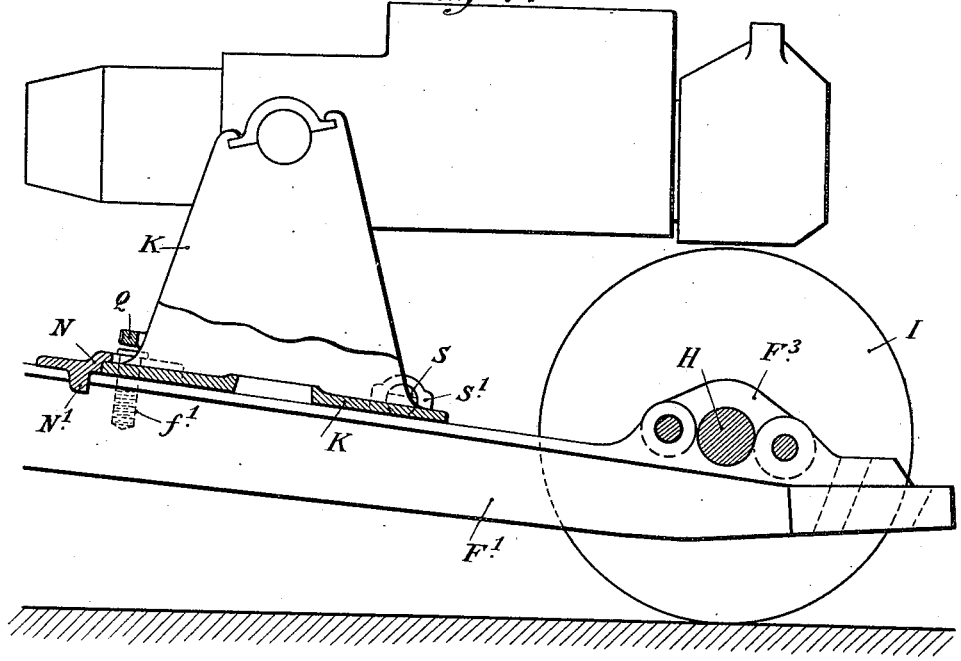
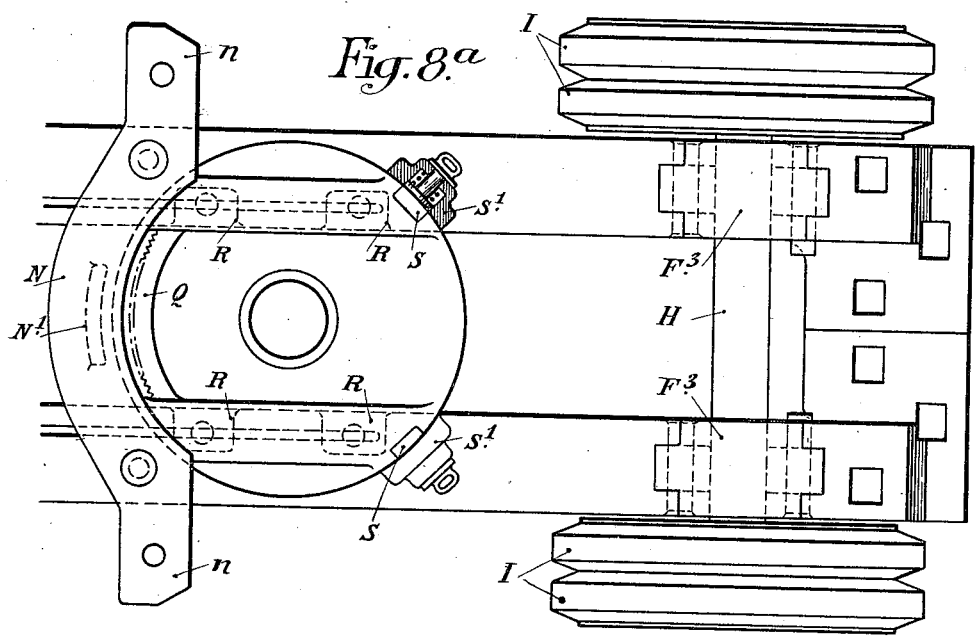

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

WHEELED GUN-CARRIAGE WITH DIVERGIBLE TRAILS.

1,310,142.          Specification of Letters Patent.     Patented July 15, 1919.

Application filed February 14, 1918. Serial No. 217,190.

*To all whom it may concern:*

Be it known that I, EUGÈNE SCHNEIDER, a citizen of the French Republic, and a resident of Le Creuzot, Saône-et-Loire, France, have invented a new and useful Improvement in Wheeled Gun-Carriages with Divergible Trails, which invention is fully set forth in the following specification.

This invention has for its object to provide an improved wheeled gun carriage with divergible trails comprising a longitudinally extending axis between the axle of the gun carriage wheels and the gun carriage proper.

In the accompanying drawings:—

Figures 1 and 2 are respectively a diagrammatic side elevation and a diagrammatic plan of one embodiment of this invention.

Fig. 3 is a plan showing the gun carriage in position for transport.

Figure 7:
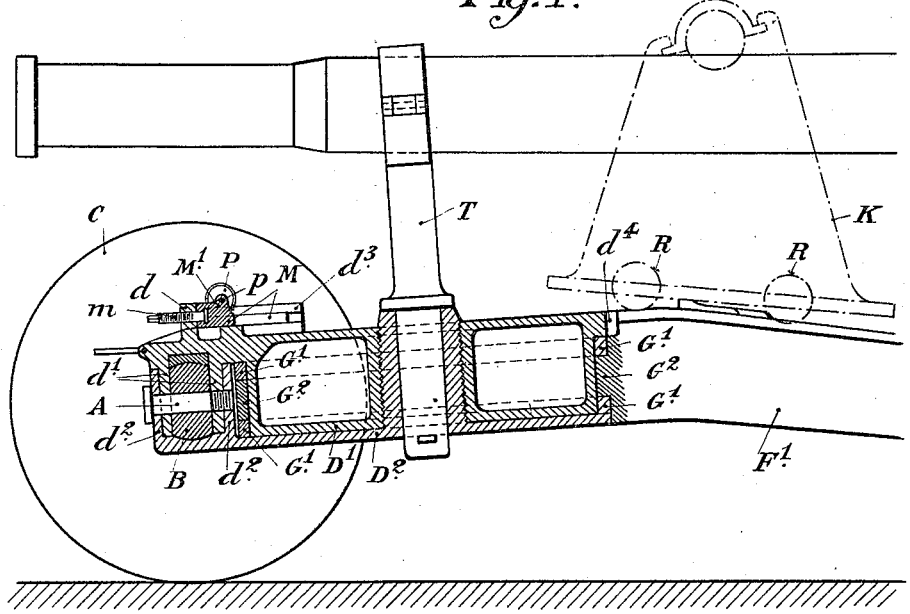

Figs. 7 and 7ª taken together constitute a longitudinal side elevation partly in section showing the carriage and the gun in position for transport.

Figure 8:
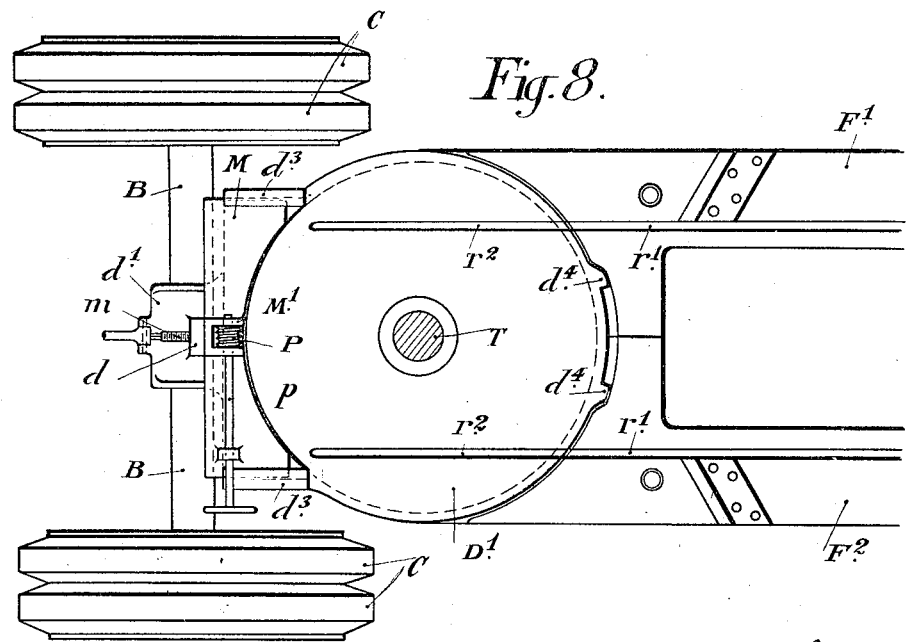

Figs. 8 and 8ª taken together constitute a corresponding plan thereto.

Figure 9:
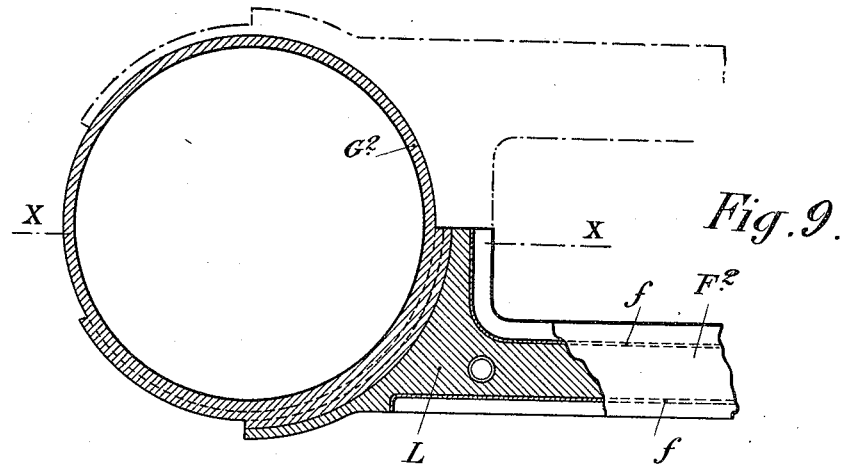
Figure 10:
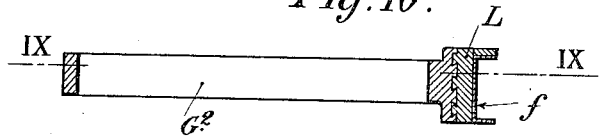

Fig. 9 is a horizontal section illustrating a detail on the line IX—IX of Fig. 10.

Fig. 10 is a vertical section on the line X—X of Fig. 9.

These two figures show one of the trail heads more particularly designed for use in combination with the embodiment illustrated in Figs. 4 to 8.

Figure 11:
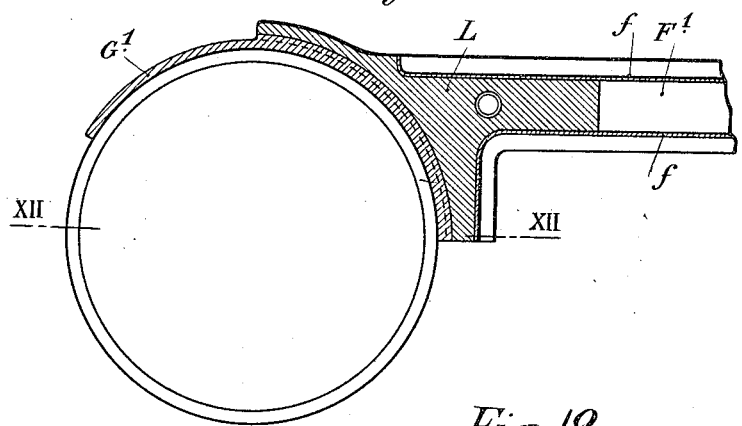
Figure 12:
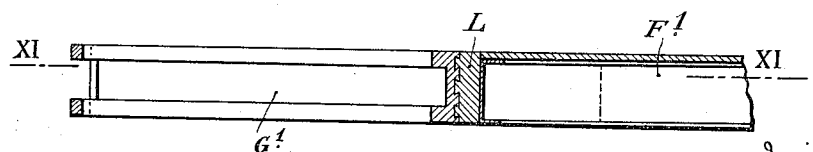

Fig. 11 is a horizontal section on the line XI—XI of Fig. 12, and

Fig. 12 is a vertical section on the line XII—XII of Fig. 11, illustrating the head of the other trail of the gun carriage.

Fig. 13 is a diagrammatic side elevation partly in vertical section illustrating a modification.

Referring first to Figs. 1 and 2, in the improved gun carriage A is a longitudinal pivot located between the wheeled axle C—B—C and an element of the gun carriage or carriage head D which is movable on a vertical axle pin E relatively to the carriage body or support G to which the divergible trails F are movably jointed.

The element D may be fixed to the carriage body or support G for firing by means of a suitable locking device O which fixes it to the part G in a mid position. Inversely, for transport, when the element D has been unlocked and the trails F have been moved close up against each other and are supported at their rear ends on an auxiliary wheeled axle I—H—I as shown in diagrammatic plan in Fig. 3, the whole constituted by the wheeled axle C—B—C, the pivot A, and the carriage element D, can be trained horizontally with relation to the carriage body F—G—F.

By this means the wheeled axle can serve as a training or a steering fore-carriage for transport, in combination with the rear axle I—H—I upon or below the axle H of which the trails are supported in their closed position.

The carriage head G serves in the usual way as a support for a small gun mount K which is adapted to pivot on a real pivot pin *k* or to turn about any other suitable axis for training the gun.

In the embodiment illustrated in Figs. 1, 2 and 3, the vertical axle-pin E between the carriage element D and the carriage head G is located eccentrically with relation to the geometric axis of the pivot *k* of the gun mount K. The elements G and K might have a common vertical geometric axis which is the case in the embodiment shown in detail in Figs. 7 to 12, in which example the two divergible trails F are also mounted to turn about this common axis.

The carriage element (corresponding to element D of Figs. 1, 2 and 3) which carries the longitudinal pivot pin A is in this case arranged to serve directly as a platform upon which the upper carriage or gun mount K is supported and is able to turn on said common geometrical axis. The same carriage element is also constructed in such a manner as to constitute a common pivotal axis for the heads G¹, G² of the trails F¹, F².

Figure 4:
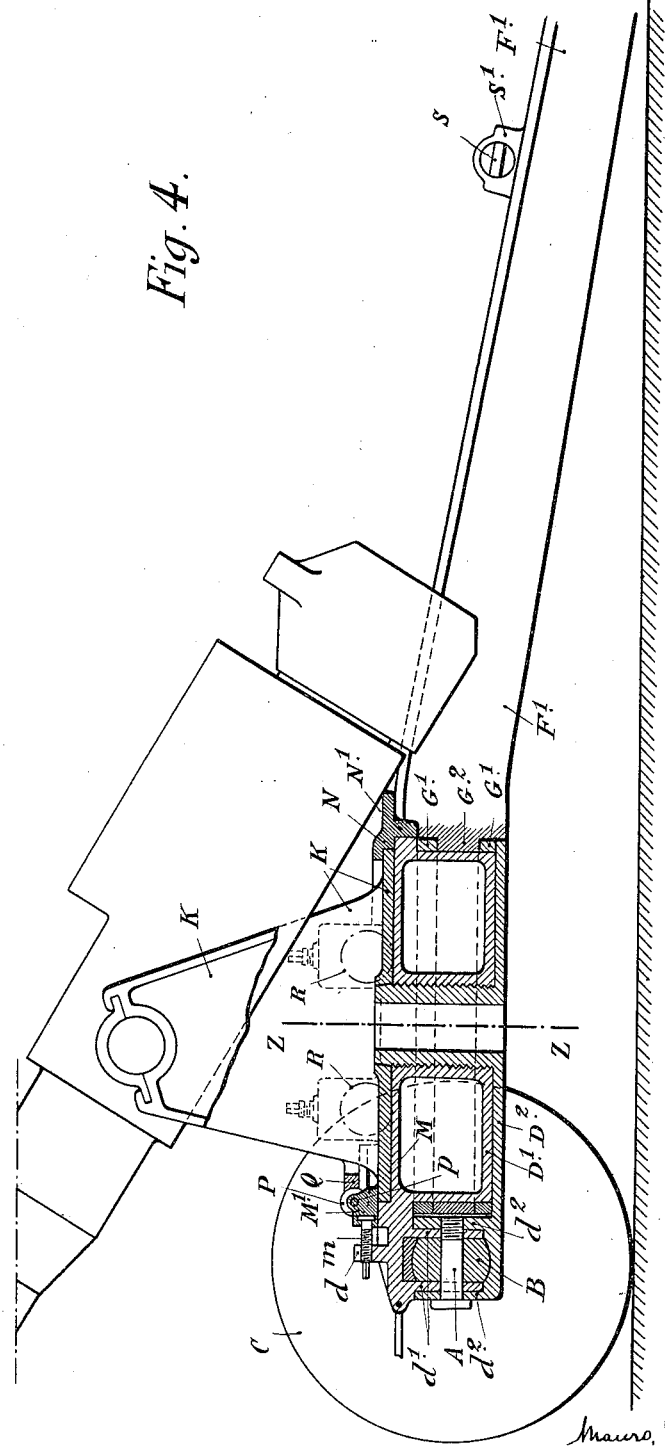
Fig. 4 is a side elevation partly in vertical longitudinal section, showing a gun carriage according to this invention in the firing position.

For facilitating erection, the carriage element is constructed as shown in Fig. 4, in two parts D¹, D², bolted or fixed together in any suitable manner. Two forked beaks *d*¹, *d*², projecting forward from the respective elements D¹ and D², and adapted to fit one in the other, serve for the passage of the axle B and form a support for the longitudinal pivot pin A.

Each of the trails $F^1$, $F^2$ has an annular head embracing the outer wall of the element $D^1$ which thus constitutes the common pivot for the two trails.

As shown, the two trails are movably jointed together at their heads, scissors-fashion, so as to be capable of rotating about the pivot formed by the carriage element $D^1$.

Figs. 9 to 12 show the constructional details of the trails.

Each trail comprises in the usual manner two assembled side members $f$. These side members hold between them a block L on the arc-shaped face of which there is engaged by means of a dovetail connection, a ring $G^1$, or $G^2$ that constitutes the trail head proper.

When the trails $F^1$, $F^2$ are closed, that is to say, brought close together, in the position shown in plan in Fig. 8, and engaged at their rear end upon the axle H of a rear wheeled axle I—H—I by any suitable means, such as for instance the collars $F^3$, it will be perceived that the whole constituted by the wheeled axle C—B—C, the pivot pin A, and the carriage element $D^1$, $D^2$, carrying said pivot, can be rotated horizontally, that is to say trained, with relation to the whole constituted by the said trails and the rear wheeled axle.

In the example shown, the holding of the gun mount K upon the platform consisting of the carriage element $D^1$, is assured by means of two attached sectors M and N which together with the said platform constitute the guiding means for the gun mount.

The sector M is slidable in guides $d^3$ formed on the carriage element $D^1$; by this arrangement the said sector can be rendered inoperative by moving it forward into the position shown in Figs. 7 and 8.

This movement can be imparted to it by operating a screw $m$ carried by it, which works in a nut $d$ formed on the beak $d^1$.

Figure 5:
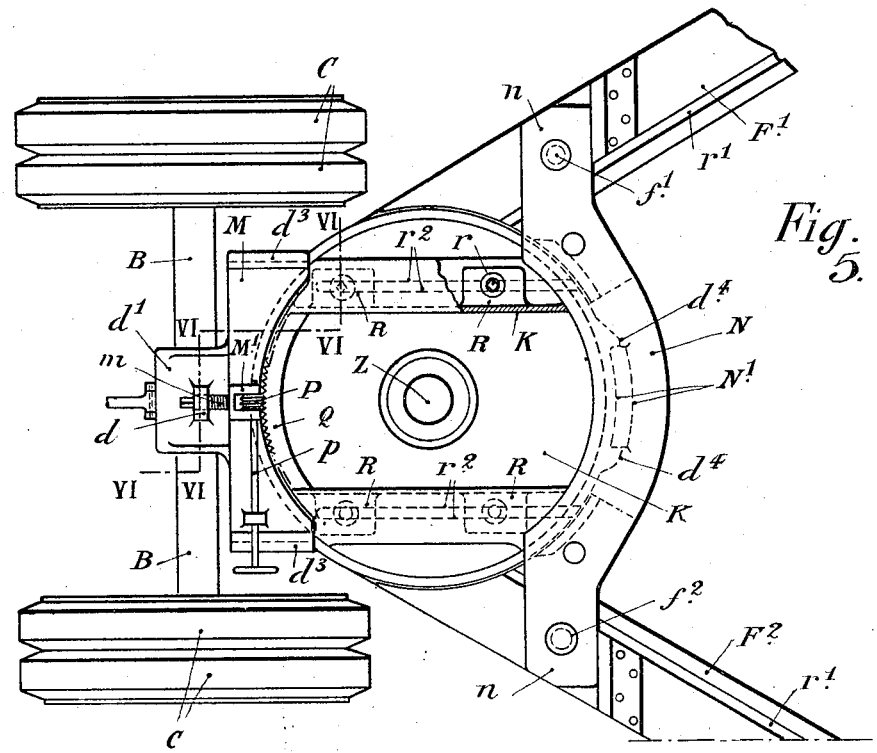
Fig. 5 is a corresponding part plan thereto.

The sector N is removable and has two extensions $n$ to which the trails $F^1$, $F^2$, can be locked by means of pins $f^1$ and $f^2$, when they have been moved apart to the fullest extent of their divergence as shown in Fig. 5.

The whole constituted by the wheeled axle C—B—C, the pivot pin A, and the carriage element $D^1$—$D^2$ can be rendered stationary as regards horizontal movement, when the gun carriage is in the firing position, by the engagement of a boss $N^1$ projecting from the underside of the sector N, in a corresponding lodgment located between two projections $d^4$ of the carriage element $D^1$.

The holding and guiding sector M may form a bearing by means of a block $M^1$, for a shaft $p$ upon which there is fixed a worm P engaging a toothed sector Q carried by the gun mount K.

Consequently by operating the worm P, the gun mount K can be caused to pivot about the axis Z—Z, for the purpose of training the gun.

Figure 6:
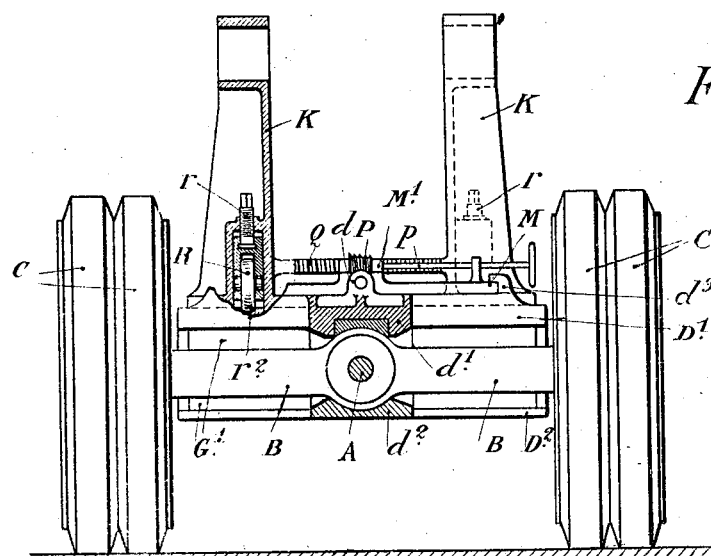
Fig. 6 is a vertical cross section on the line VI—VI of Fig. 5.

The gun mount K is provided with disappearing rollers R (Figs. 4, 5 and 6). When it is desired to arrange the gun carriage for transport, the holding and guiding sector M is moved forward into its inoperative position, and the sector N is removed. Then the trails $F^1$, $F^2$ are closed and their rear ends are hooked on to the axle H of the rear axle which has been brought to this end into the desired position. Then the screws $r$ are operated so as to slightly lift the gun mount K which can then be run back along the trails, for which purpose rolling tracks $r^1$ for the rollers R have been formed in the upper sides of the trails. When the trails are in the position shown in Fig. 8, these tracks $r^1$ come into the prolongation of tracks $r^2$ formed in the carriage element $D^1$.

The gun mount K may be fixed upon the trails in position for transport, on the one hand by means of two retaining tappets S movable in lodgments $S^1$ formed on the trails and below which the saddle of the gun mount is engaged after it has been first moved down into contact with the trails by the inverse operation of the screws $r$. On the other hand the saddle of the gun mount is held in front by the sector N which has been moved into the position shown in Fig. $8^a$ and pinned in said position.

In a central recess in the carriage element $D^2$ there may be engaged a support T that constitutes with its upper end a stop collar for holding the chase of the gun barrel.

Fig. 13 illustrates a modification of the improved gun carriage wherein the common geometrical axis Z—Z for training the front wheeled axle, for the pivotation of the trails, and the training of the gun mount K, passes vertically through the center of the axle B of the front wheeled axle.

This construction is less advantageous because it only allows a very limited training angle of the front wheeled axle relatively to the trails supported by the rear wheeled axle.

What I claim is:—

1. In a wheeled gun carriage having divergible trails, the combination of a fore wheeled axle, a gun carriage proper, and a gun carriage support movable about a vertical axis, with a longitudinal pivot pin between said axle and said support, a pair of trails each mounted to turn about an axis on said support, and a rear wheeled axle, whereby said fore wheeled axle and the carriage support to which it is pivoted may turn horizontally with relation to said trails, and whereby the said fore wheeled axle serves as a horizontally rotatable fore carriage for transport.

2. In a gun carriage, the combination of a fore wheeled axle, a gun carriage proper, and two divergible trails all mounted to turn independently about a common vertical axis, and a rear wheeled axle, whereby the fore wheeled axle may be rotated horizontally with relation to the trails when the latter are connected to the rear wheeled axle and the gun carriage may be turned horizontally for training the gun.

3. In a wheeled gun carriage, the combination of a fore wheeled axle, an annular head, a pair of divergible trails mounted to turn about said annular head, a gun carriage mounted to turn on said annular head, and a longitudinal pin connecting the fore wheeled axle with said annular head.

4. In a wheeled gun carriage, the combination of a gun carriage mounted on disappearing rollers, a gun carriage head or support having guides or ways formed thereon for said rollers, with a pair of pivotally mounted divergible trails whereby the latter may be brought close together, and guides or ways on said trails in alinement with the guides or ways on said gun carriage support when said trails are in closed position, whereby the gun carriage head or support may be moved along said guides or ways from the gun carriage head or support on to the guides or ways on said trails.

5. In a wheeled gun carriage, the combination of a fore wheeled axle, a gun carriage head or support, and a gun carriage, with a pair of divergible trails each mounted to turn about an axis on said head or support, a removable cross member adapted to engage the trails when the latter are opened out and to hook into the support of the gun carriage, said cross member being also capable of serving as a part for guiding and holding the gun carriage in firing position and also as a member for holding said carriage upon the trails in position for transport.

In testimony whereof I have signed this specification.

EUGÈNE SCHNEIDER.

Witnesses:
  ANDRÉ MOSTICKER,
  CHAS. P. PRESSLY.

Copies of this patent may be obtained for five cents each, by addressing the "Commissioner of Patents, Washington, D. C."